United States Patent [19]

Baxter et al.

[11] Patent Number: 5,048,770
[45] Date of Patent: Sep. 17, 1991

[54] FILM CASSETTE WITH EXPOSURE STATUS INDICATOR

[75] Inventors: Dennis E. Baxter, East Rochester; Jeffrey R. Stoneham, Hilton, both of N.Y.

[73] Assignee: Eastman Kodak Company, Rochester, N.Y.

[21] Appl. No.: 529,287

[22] Filed: May 29, 1990

[51] Int. Cl.⁵ .............................................. G03B 17/26
[52] U.S. Cl. ..................................... 242/71.1; 354/275
[58] Field of Search ............................ 242/71.1, 71.2; 354/275

[56] References Cited

U.S. PATENT DOCUMENTS

| | | | |
|---|---|---|---|
| 3,831,881 | 8/1974 | Tucker | 242/194 |
| 4,887,110 | 12/1989 | Harvey | 354/275 |
| 4,978,985 | 12/1990 | Smart et al. | 242/71.1 X |
| 4,987,437 | 1/1991 | Pagano et al. | 242/71.1 X |

Primary Examiner—John M. Jillions
Attorney, Agent, or Firm—Roger A. Fields

[57] ABSTRACT

A film cassette comprises a spool rotatable about an axis to thrust a filmstrip coiled about the spool out of the cassette shell, and an exposure status indicator rotatable about the axis from an unexposed position to an exposed position for providing respective indications that the filmstrip is unexposed or is exposed. According to the invention, the shell and the status indicator include respective engagable means at least one of which is supported for movement relative to the other substantially radially of the axis in opposite directions for engagement to secure the status indicator in its unexposed and exposed positions and for disengagement to permit rotation of the status indicator from the unexposed to the exposed position.

4 Claims, 14 Drawing Sheets

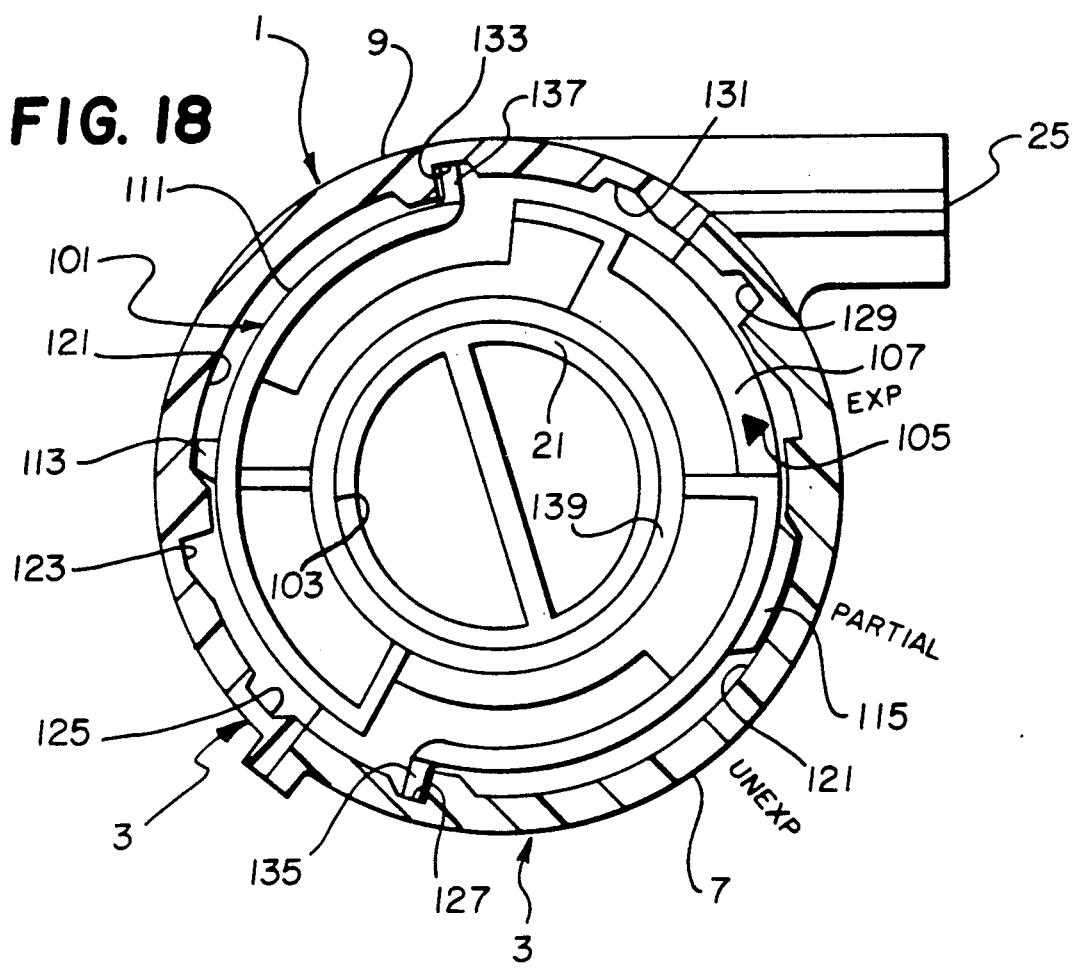

FILM CASSETTE WITH EXPOSURE STATUS INDICATOR

CROSS REFERENCE TO RELATED APPLICATIONS

Reference is made to commonly assigned copending applications Ser. No. 07/529,285 entitled FILM CASSETTE WITH EXPOSURE STATUS INDICATOR, and filed May 29, 1990 in the names of Dennis E. Baxter and Jeffrey R. Stoneham; Ser. No. 07/520,309 entitled FILM CASSETTE WITH FILM EXPOSURE STATUS INDICATOR, and filed May 7, 1990 in the names of Stephen H. Miller and Daniel M. Pagano now U.S. Pat. No. 4,987,437; Ser. No. 07/384,332 entitled FILM CASSETTE HAVING FILM EXPOSURE STATUS INDICATOR, and Filed July 24, 1989 in the names of David C. Smart et al now U.S. Pat. No. 4,978,985; Ser. No. 07/390,931 entitled CAMERA FOR USE WITH FILM CASSETTE HAVING FILM EXPOSURE STATUS INDICATOR, and filed Aug. 8, 1989 in the names of David C. Smart et al now U.S. Pat. No. 4,965,600; and Ser. No. 07/436,265 entitled CAMERA APPARATUS FOR PREVENTING LOAD OF EXPOSED FILM, and filed Nov. 14, 1989 in the name of David C. Smart now U.S. Pat. No. 4,994,828.

BACKGROUND OF THE INVENTION

1. Field of the Invention

The invention relates generally to the field of photography, and in particular to a film cassette containing roll film. More specifically, the invention relates to a film cassette having indicator means for informing the photographer that a filmstrip inside the cassette is unexposed, only partly exposed, or substantially exposed.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader is normally non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall. During initial unwinding rotation of the film spool, the leading end of the filmstrip is advanced to and through a non-lighttight film passageway in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced out of the cassette shell. In the patent, it is suggested that one manually rotate the film spool relative to the cassette shell until the film leader can be manually grasped and attached to a film advancing device in the camera. Thus, the camera is not used to rotate the film spool to advance the film leader from the cassette shell.

More recently, in U.S. Pat. No. 4,834,306, granted May 30, 1989, U.S. Pat. No. 4,846,418, granted July 11, 1989, U.S. Pat. No. 4,848,693, granted July 18, 1989, U.S. Pat. No. 4,875,638, granted Oct. 24, 1989, U.S. Pat. No. 4,887,110, granted Dec. 12, 1989, and U.S. Pat. No. 4,894,673, granted Jan. 16, 1990, there are disclosed other film cassettes wherein a non-protruding leader is advanced automatically out of the cassette shell responsive to rotation of the film spool in an unwinding direction. In those patents, as compared to U.S. Pat. No. 4,423,943, however, there is no suggestion to manually rotate the film spool to expel the film leader.

In conventional 35 mm film manufacturers' cassettes, after the filmstrip is completely exposed, the film spool is rotated in a winding direction to rewind the film leader into the cassette shell. Since the film leader cannot subsequently be advanced out of the cassette shell (because of the binding effect between the film roll and the shell), this usually serves as an indication that the filmstrip is completely exposed. Conversely, in the film cassettes disclosed in U.S. Pat. Nos. 4,423,943, 4,834,306, 4,846,418, 4,848,693, 4,875,638, 4,887,110, and 4,894,673, the film leader can be automatically advanced out of the cassette shell by rotating the film spool in the unwinding direction. This can be done regardless of whether the filmstrip is unexposed, completely exposed, or only partly exposed. Some of the film cassettes disclosed in these patents provide no indication as to the exposure status of the filmstrip, others provide some indication of the exposure status.

THE CROSS-REFERENCED APPLICATIONS

The cross-referenced applications each disclose a film cassette capable of advancing a filmstrip automatically out of a light-tight cassette shell whether the filmstrip is unexposed, only partly exposed, or substantially exposed. The film cassette is characterized in that a film exposure status indicator can be disposed in any one of three unique exposure-related positions comprising an unexposed position for providing a visible indication that the filmstrip is unexposed, a partly exposed position for providing a visible indication that the filmstrip is only partly exposed, and a fully exposed position for providing a visible indication that the filmstrip is substantially exposed.

SUMMARY OF THE INVENTION

A film cassette comprising a film spool supported inside a lighttight cassette shell for rotation about an axis to thrust a filmstrip coiled about the spool to the exterior of the shell, and a film exposure status indicator supported for rotation outside the shell about the axis from an unexposed position for providing a visible indication that the filmstrip is unexposed to an exposed position for providing a visible indication that the filmstrip is exposed, is characterized in that:

said shell includes a shroud concentrically arranged about the axis to substantially surround a circumferential edge of the status indicator in close conformity and having several pockets opposite the circumferential edge of the indicator at respective locations corresponding to the unexposed and exposed positions of the indicator; and said status indicator includes a cantilevered member forming part of the circumferential edge of the indicator and resiliently urged against the shroud when the indicator is in its unexposed and exposed positions, to releasably secure the indicator in the unexposed and exposed positions.

BRIEF DESCRIPTION OF THE DRAWINGS

FIGS. 17 and 18 are end views similar to FIG. 16, illustrating the film exposure status indicator moved to partly exposed and fully exposed positions, respectively.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
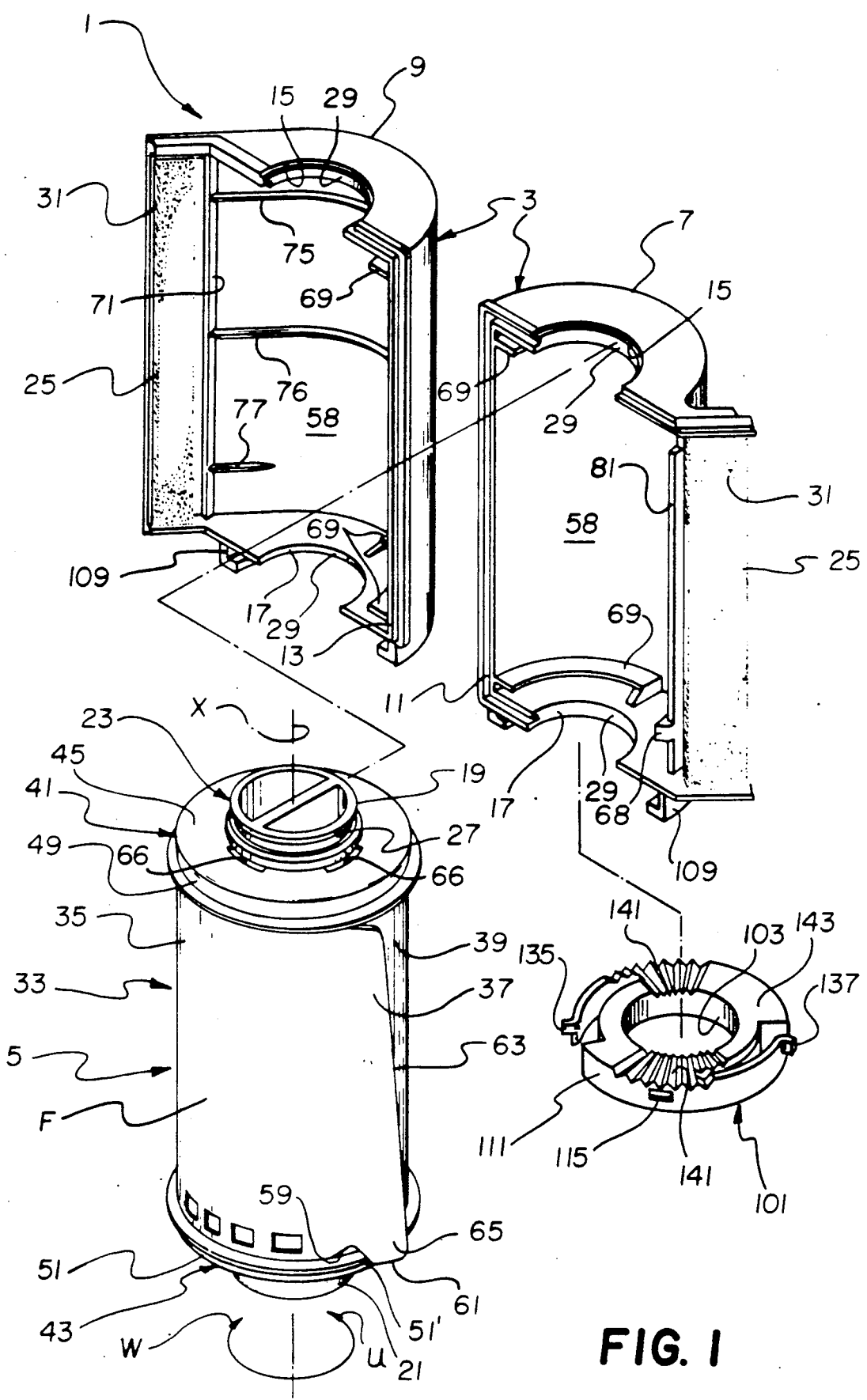
FIG. 1 is an exploded perspective view of a film cassette having a film exposure status indicator according to a preferred embodiment of the invention.
Figure 2:
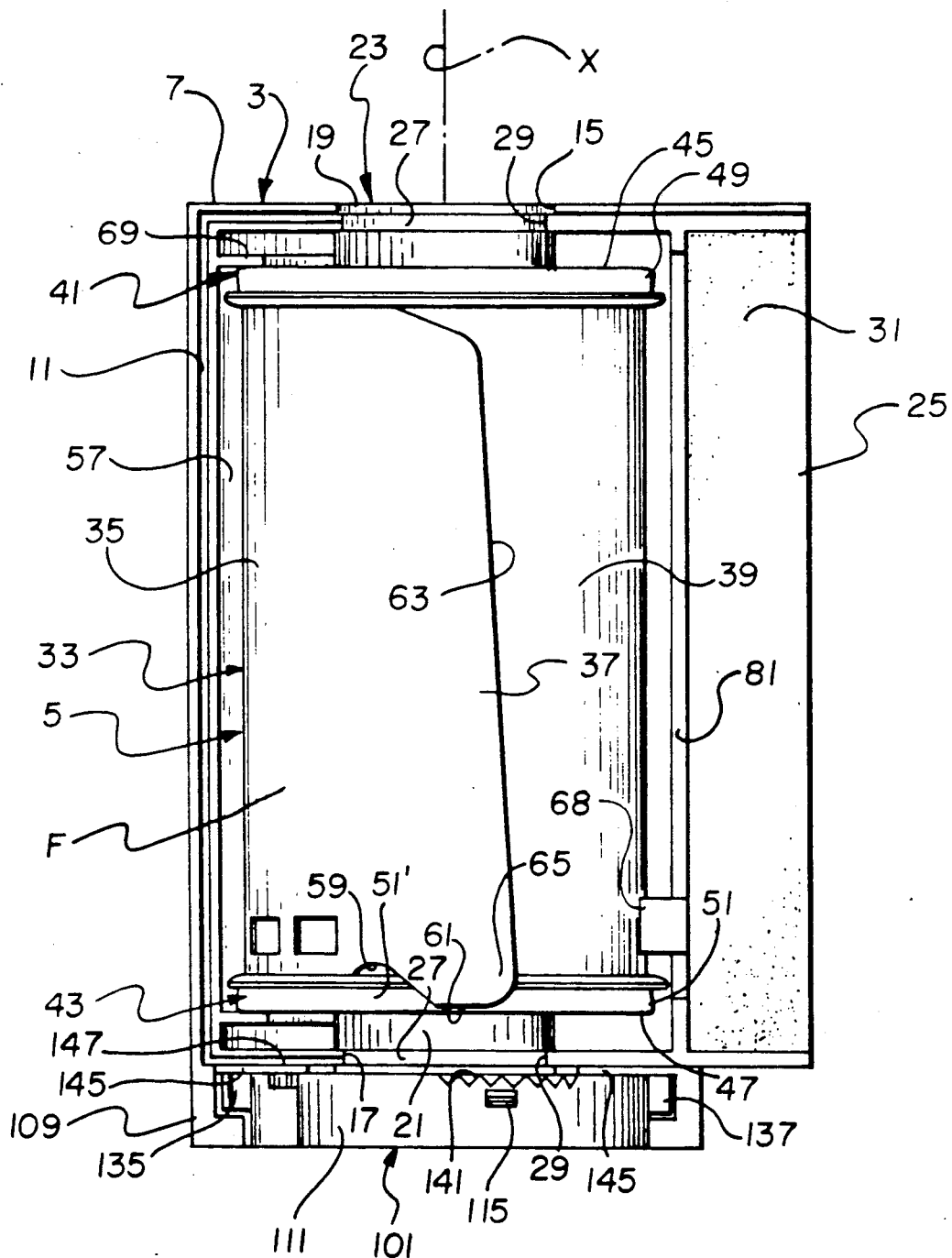
FIG. 2 is an elevation view of the film cassette, illustrating the cassette shell open to reveal a film roll coiled about a film spool.
Figure 13:
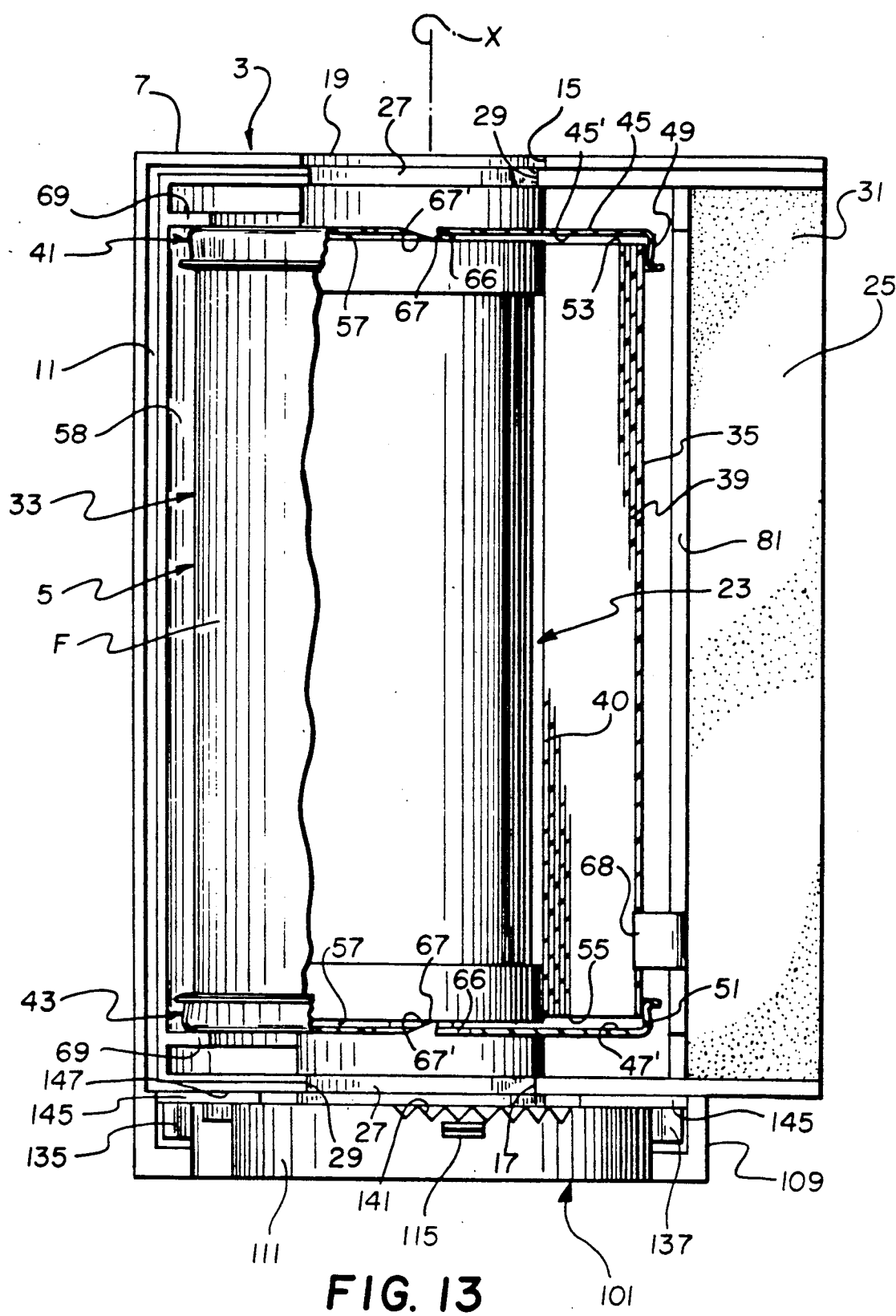
FIG. 13 is an elevation view partly in section of the film roll and the film spool, illustrating the manner in which one of a pair of film confining flanges of the spool may be fixed to the spool for concurrent rotation with the spool.

Referring now to the drawings, FIGS. 1, 2 and 13 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The shorter and longer open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
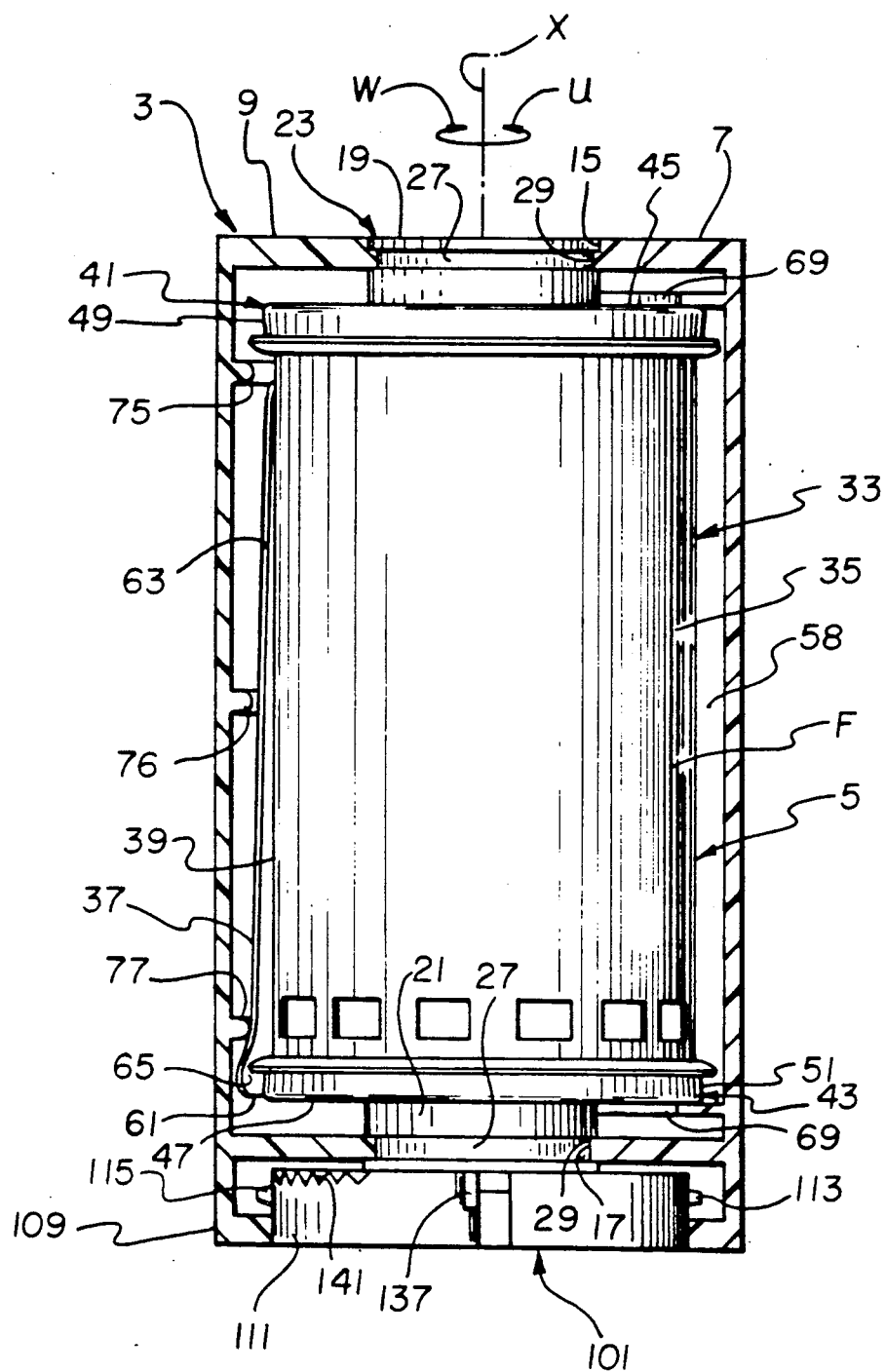
FIG. 3 is an elevation view similar to FIG. 2, through partly in section.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 9:
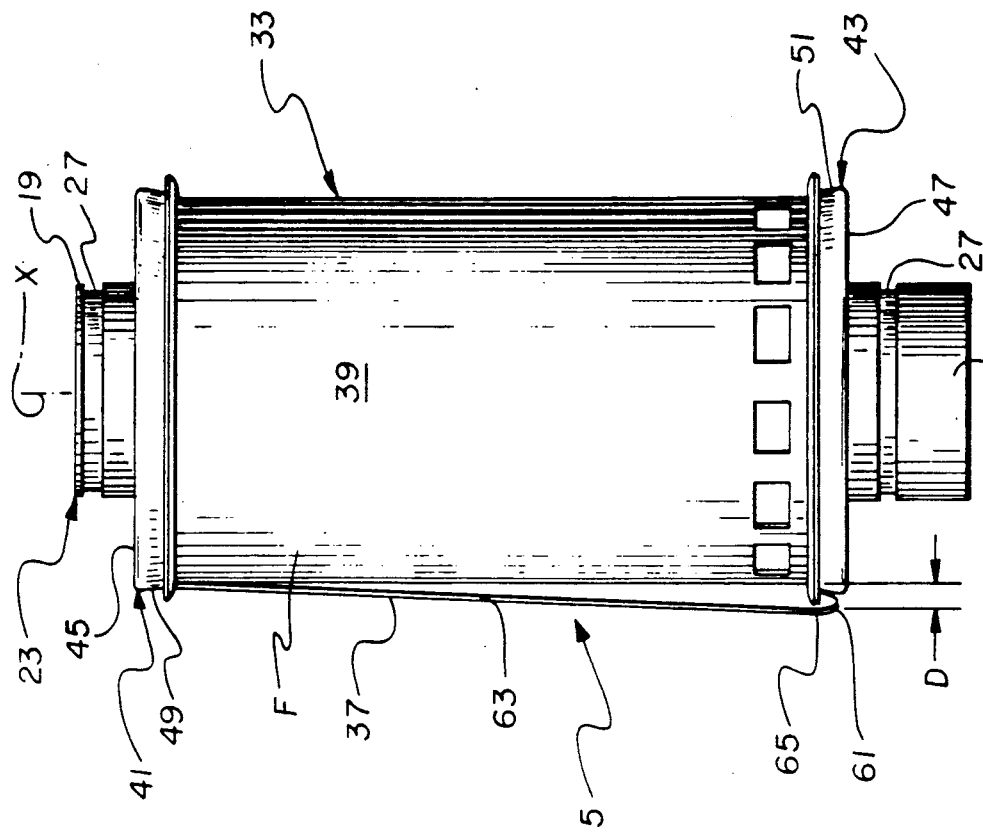
FIGS. 8 and 9 are elevation views of the film roll and the film spool, illustrating the manner in which the film roll is originally stored on the film spool.
Figure 8:
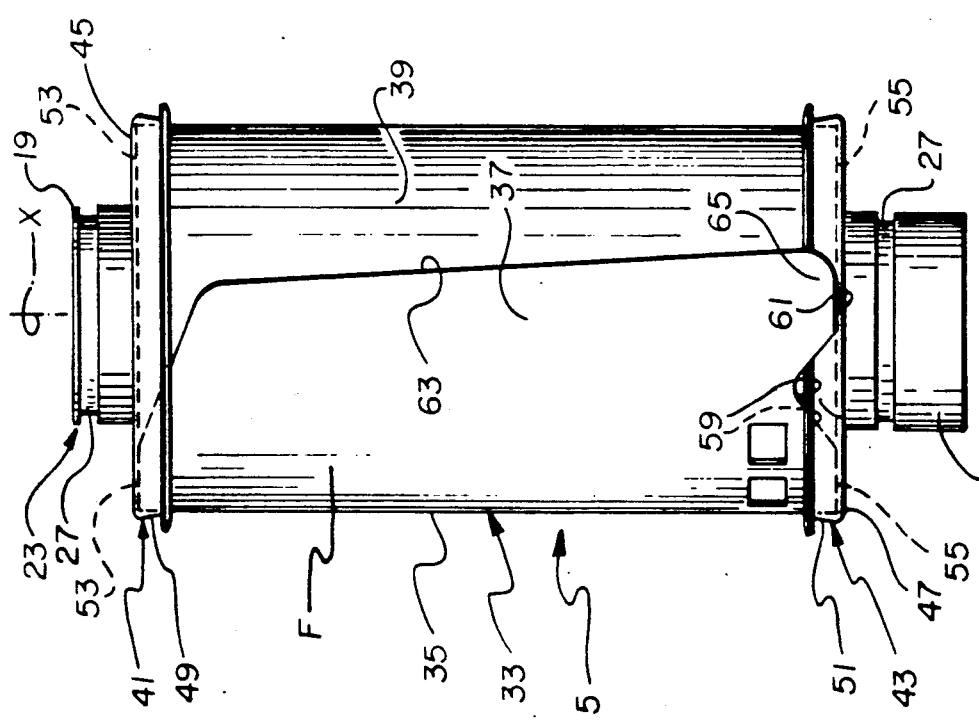

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential gaps 57 are provided in the spool core 23 for supporting the flanges 41 and 43 at their disks 45 and 47 to permit the flanges to be independently rotated about the axis X. The two gaps 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the shorter and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
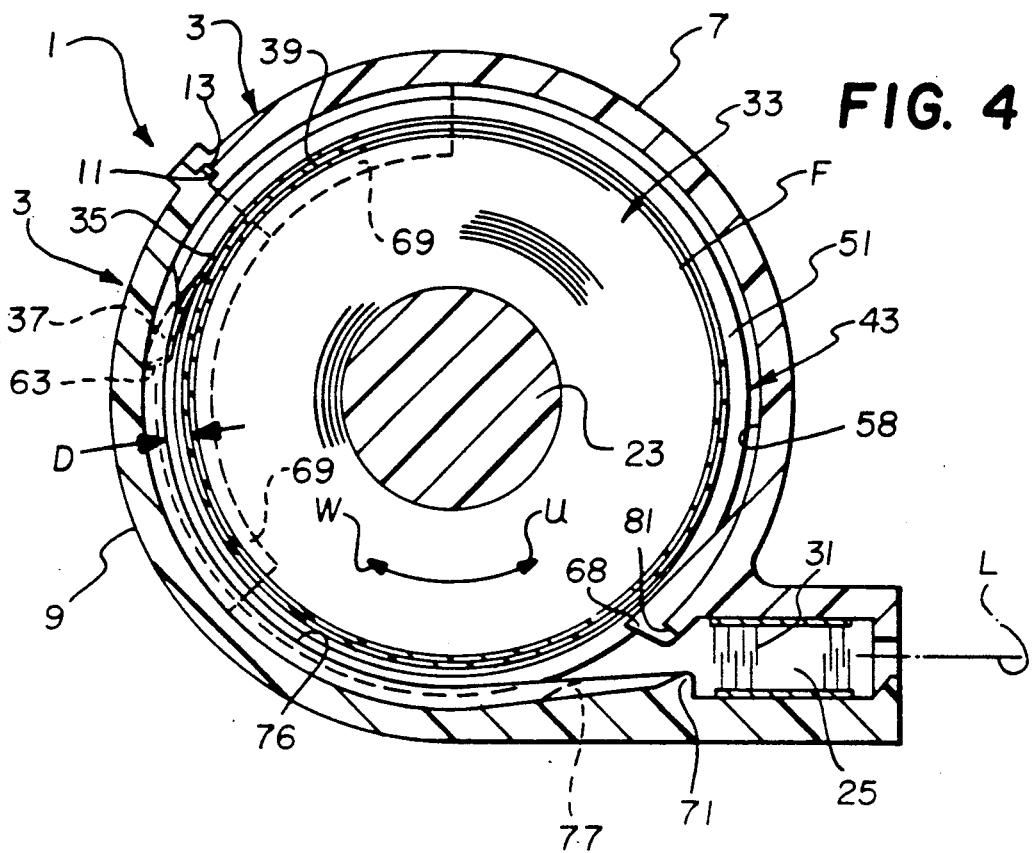
FIG. 4 is an end view partly in section of the cassette shell, the film roll and the film spool, illustrating the manner in which the film roll is originally stored on the film spool.
Figure 5:
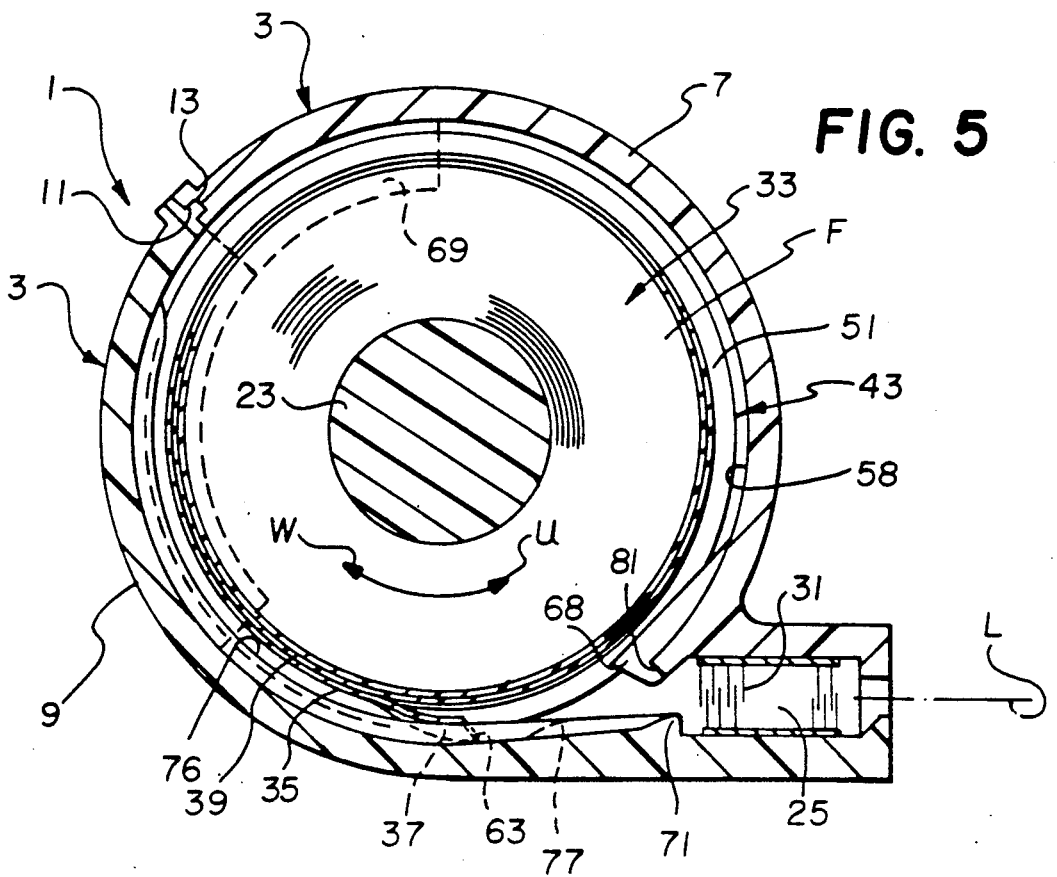
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4–7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
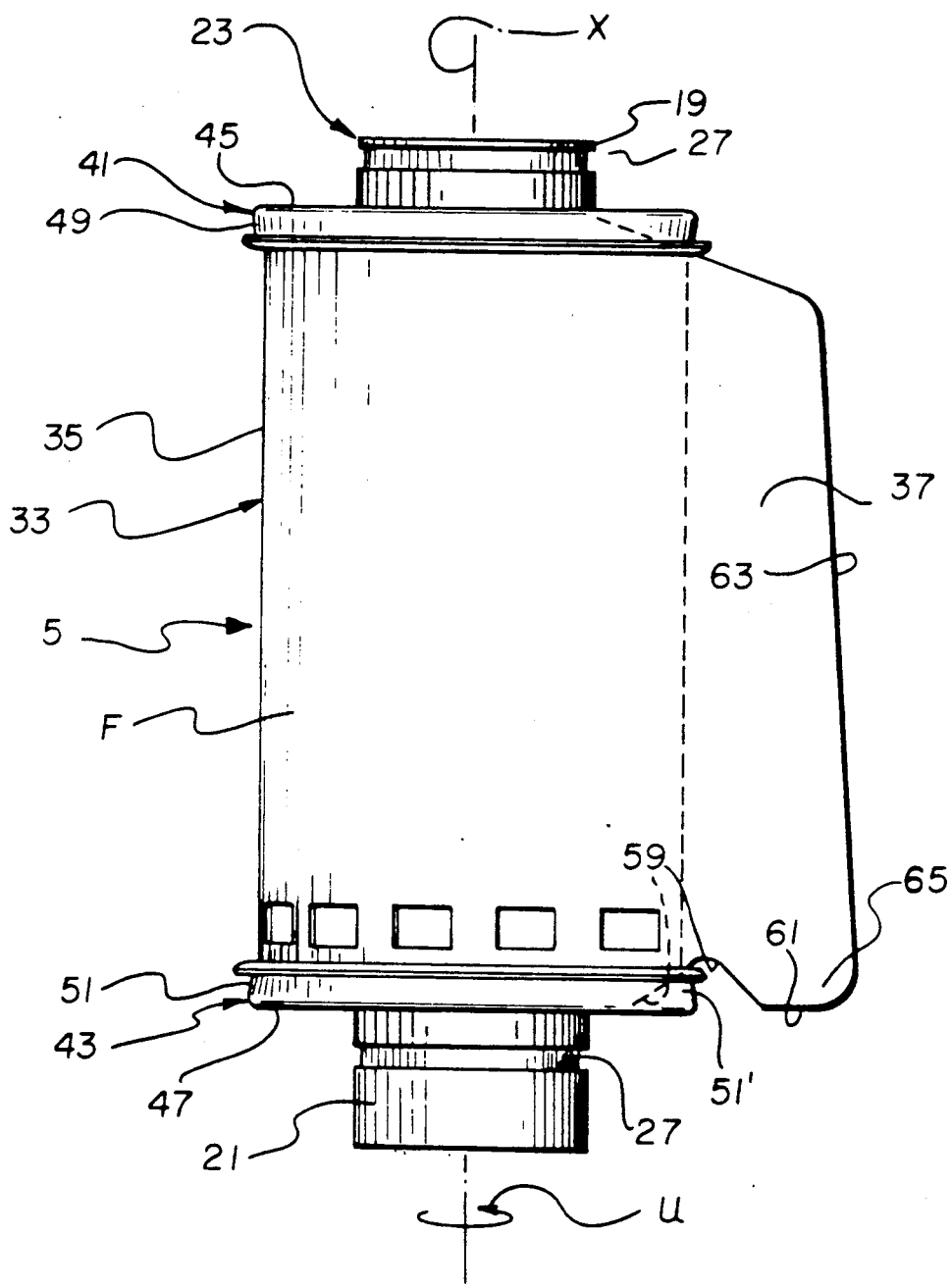
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"–0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

Figure 6:
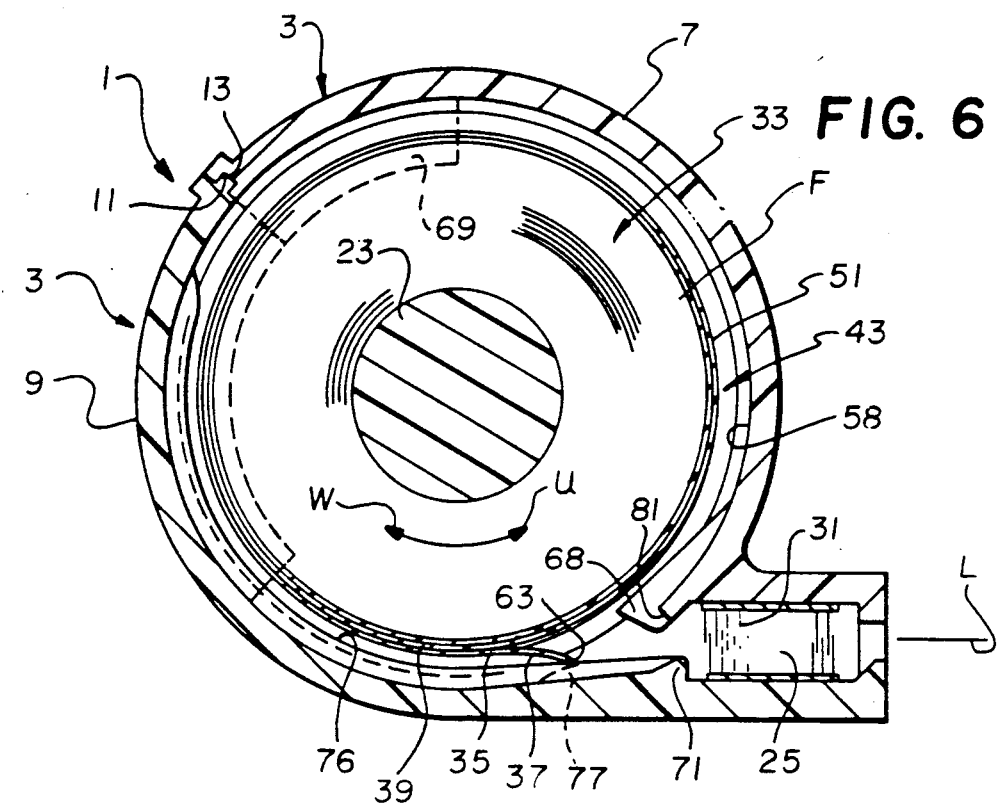
Figure 7:
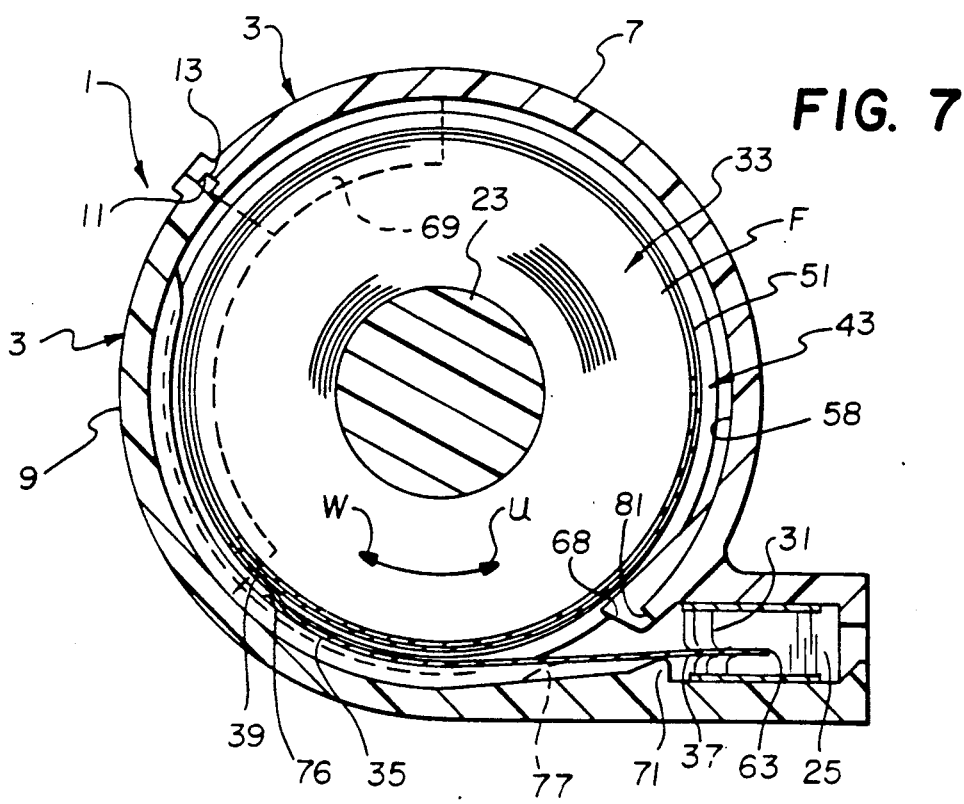
Figure 11:
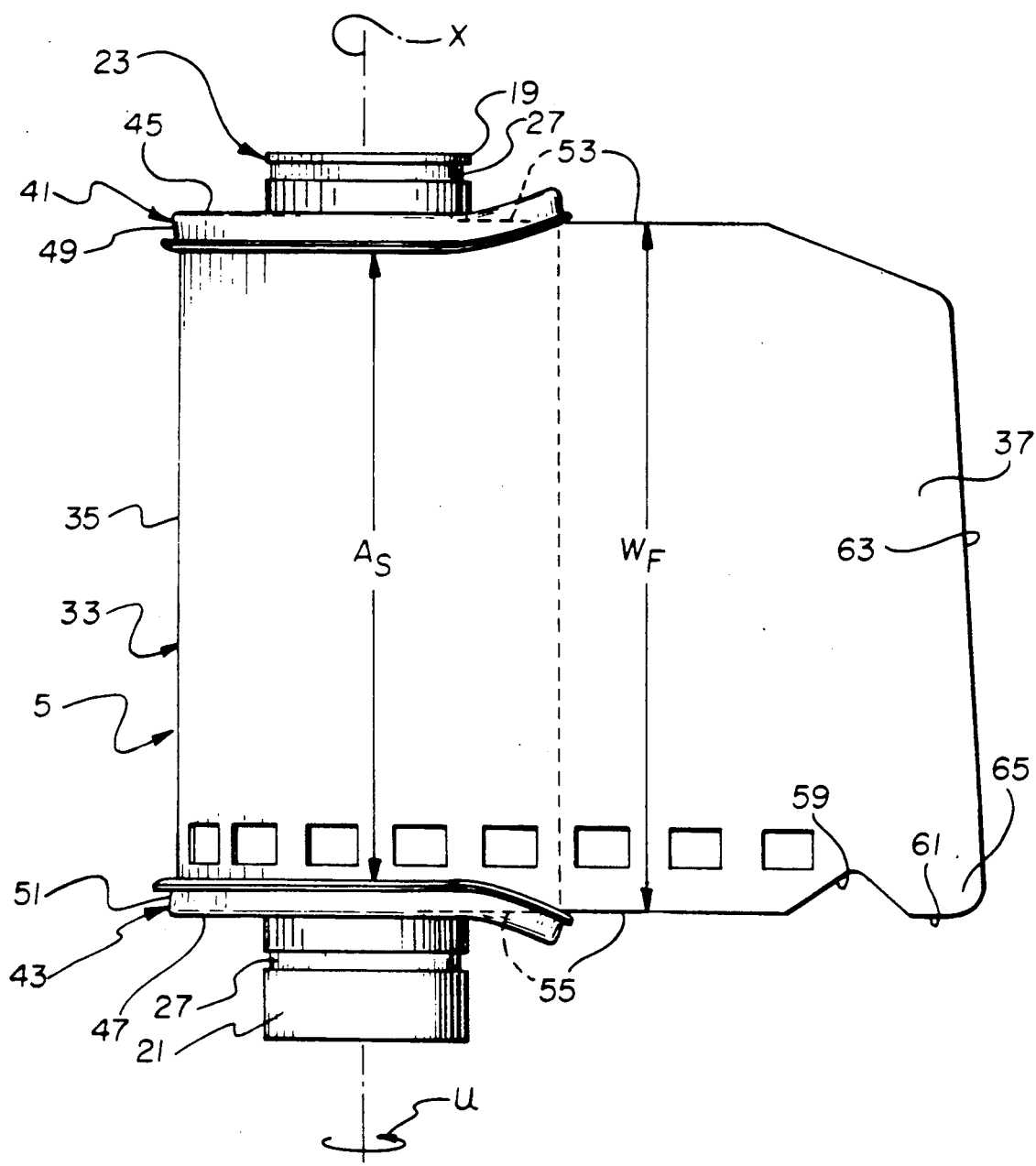
Figure 12:
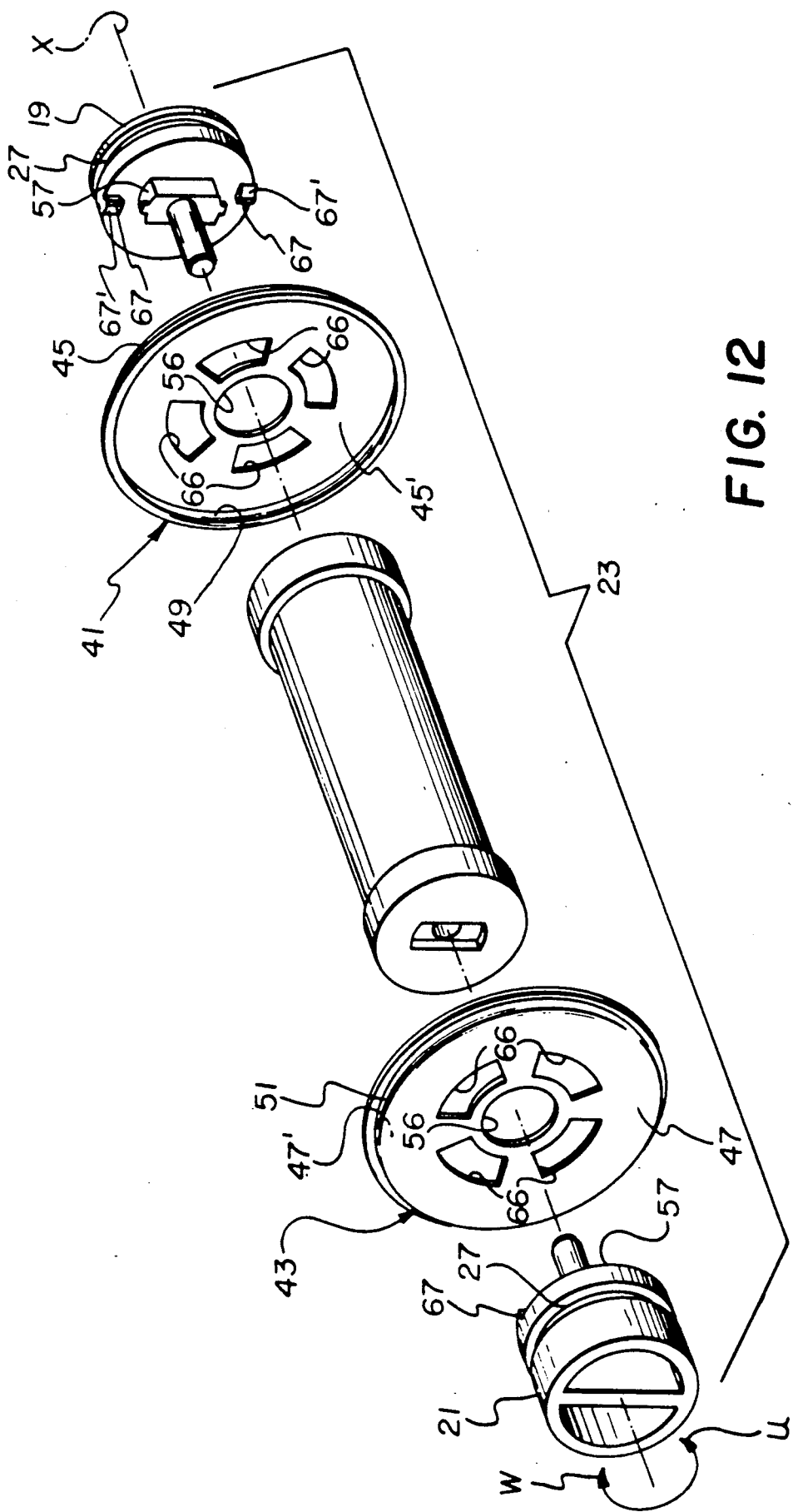
FIG. 12 is an exploded perspective view of the film spool without the film roll.

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in cited U.S. Pat. Nos. 4,834,406 and 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

The Film Exposure Status Indicator Of The Film Cassette

Figure 14:
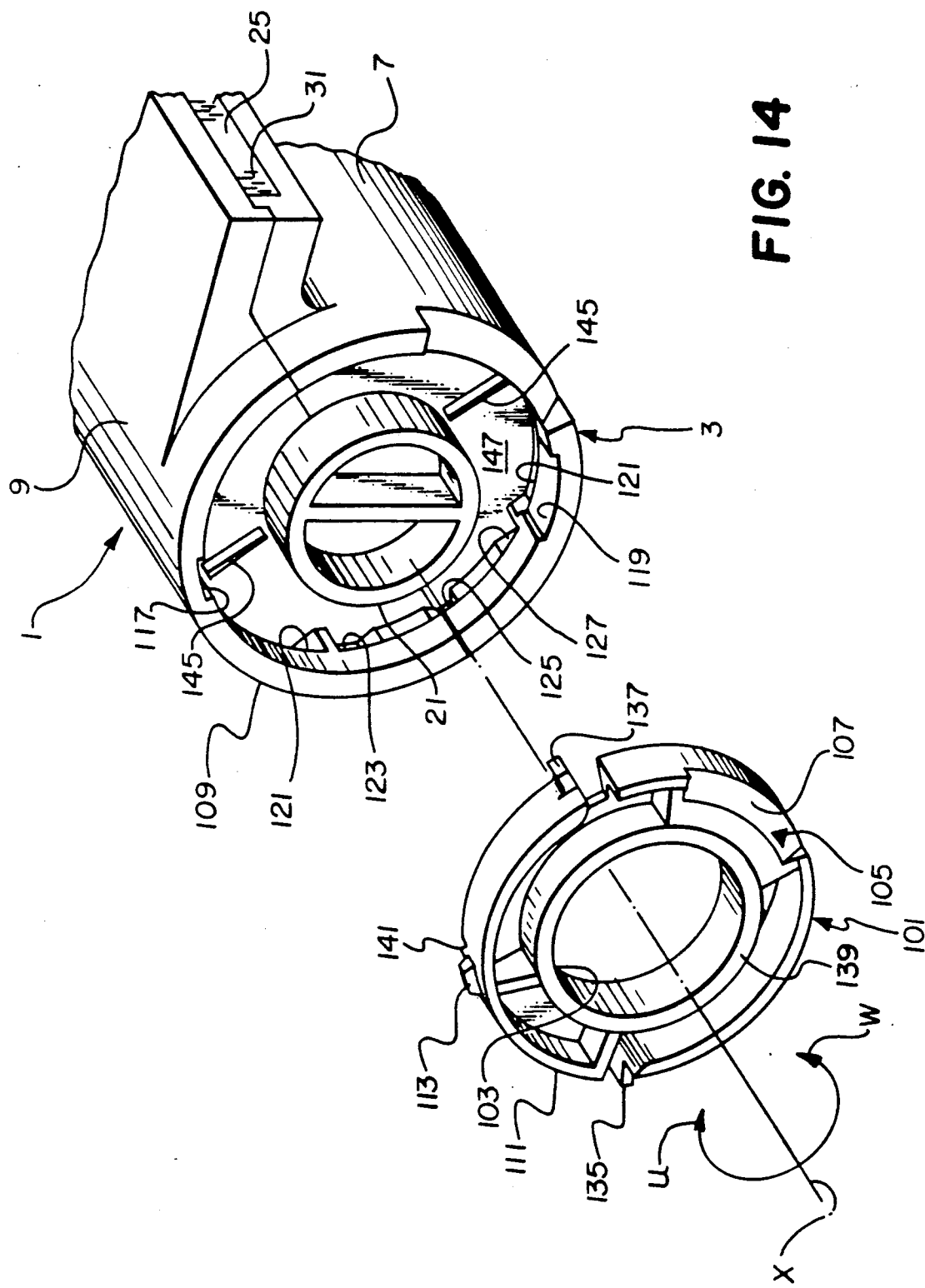
FIG. 14 is an exploded perspective view of the film exposure status indicator as seen from a top side of the indicator.
Figure 16:
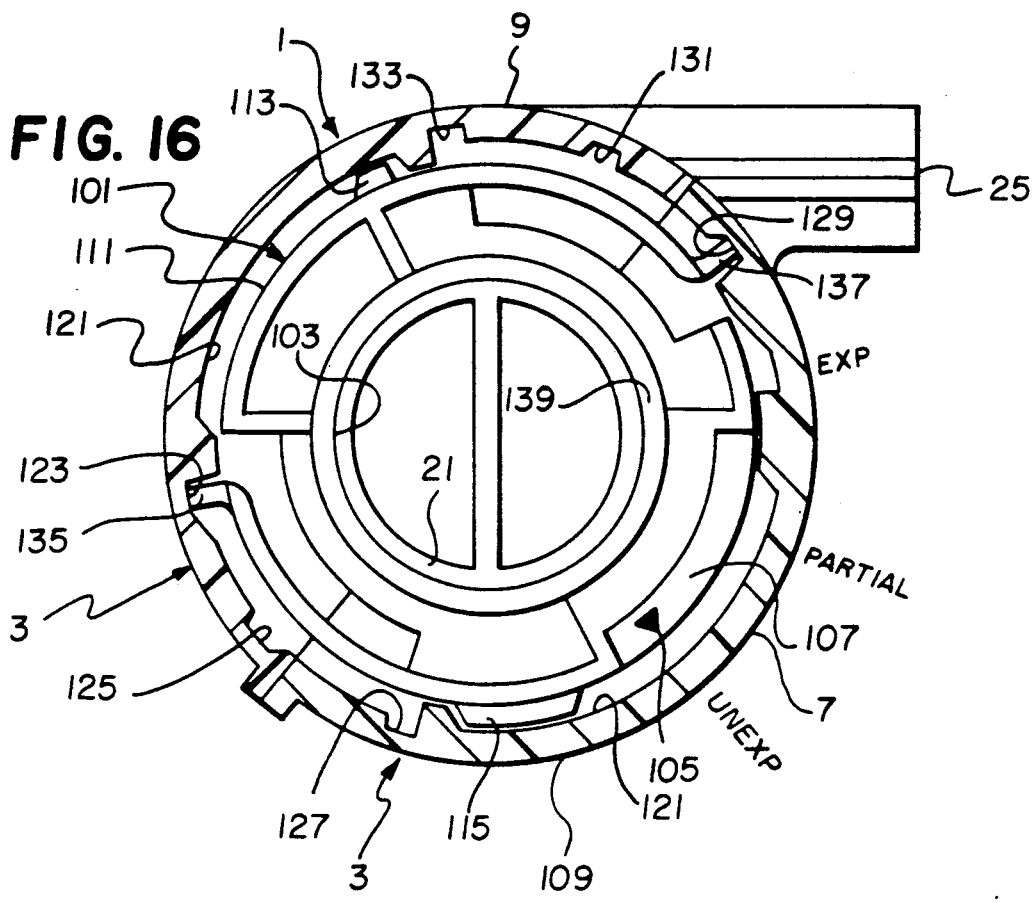
FIG. 16 is an end view of the film cassette, illustrating the film exposure status indicator in an unexposed position.
Figure 17:
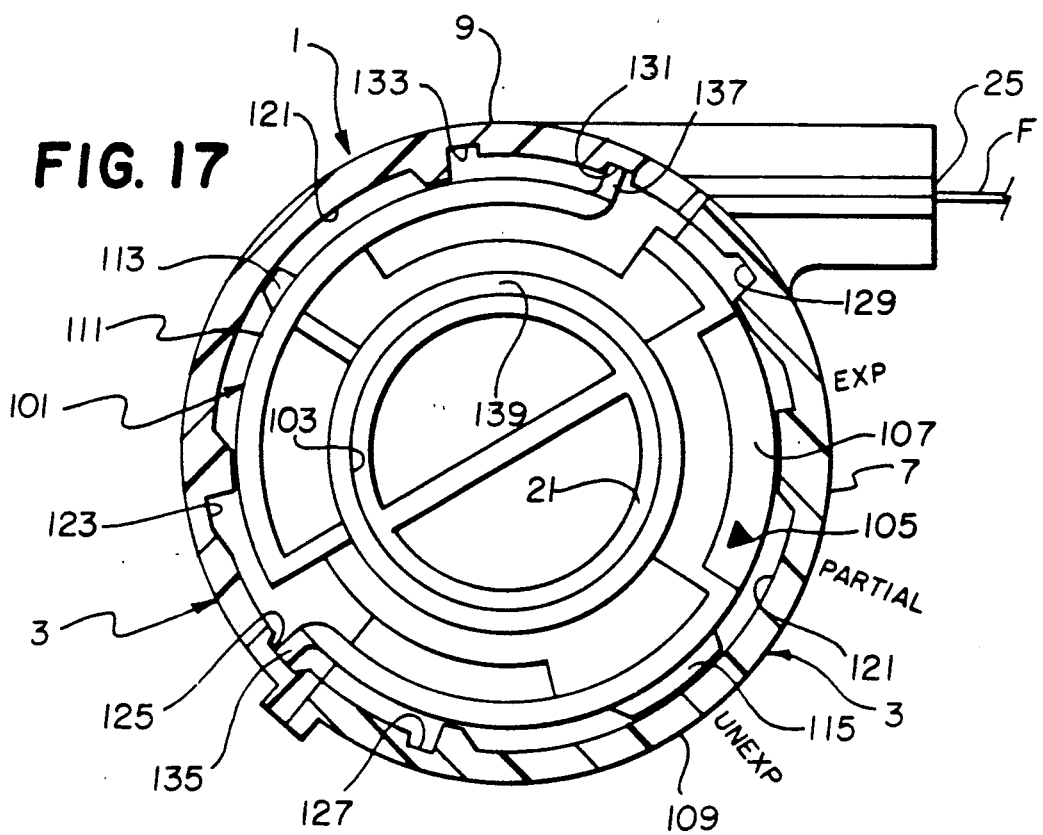

FIGS. 1, 13 and 14 depict a ring-shaped film exposure status indicator 101 having a central opening 103 which receives the longer open-end piece 21 of the spool core 23 to support the status indicator for rotation about the axis X in the winding direction W from a normal or unexposed position shown in FIG. 16, to a partly exposed position shown in FIG. 17, and to a fully exposed position shown in FIG. 18, for providing respective visible indications that the filmstrip F stored in the cassette shell 3 is unexposed, partly exposed, or substantially exposed. To achieve these visible indications, a pointer 105 is located on a beveled surface 107 of the status indicator 101 for individual alignment with each of three successive imprints "UNEXP", "PARTIAL", and "EXP" printed on the outside of the cassette shell 3. When the status indicator 101 is in its unexposed position, the pointer 105 points to the imprint "UNEXP". See FIG. 16. When the status indicator 101 is in its partly exposed position, the pointer 105 points to the imprint "PARTIAL". See FIG. 17. When the status indicator 101 is in its fully exposed position, the pointer 105 points to the imprint "EXP". See FIG. 18.

Figure 15:
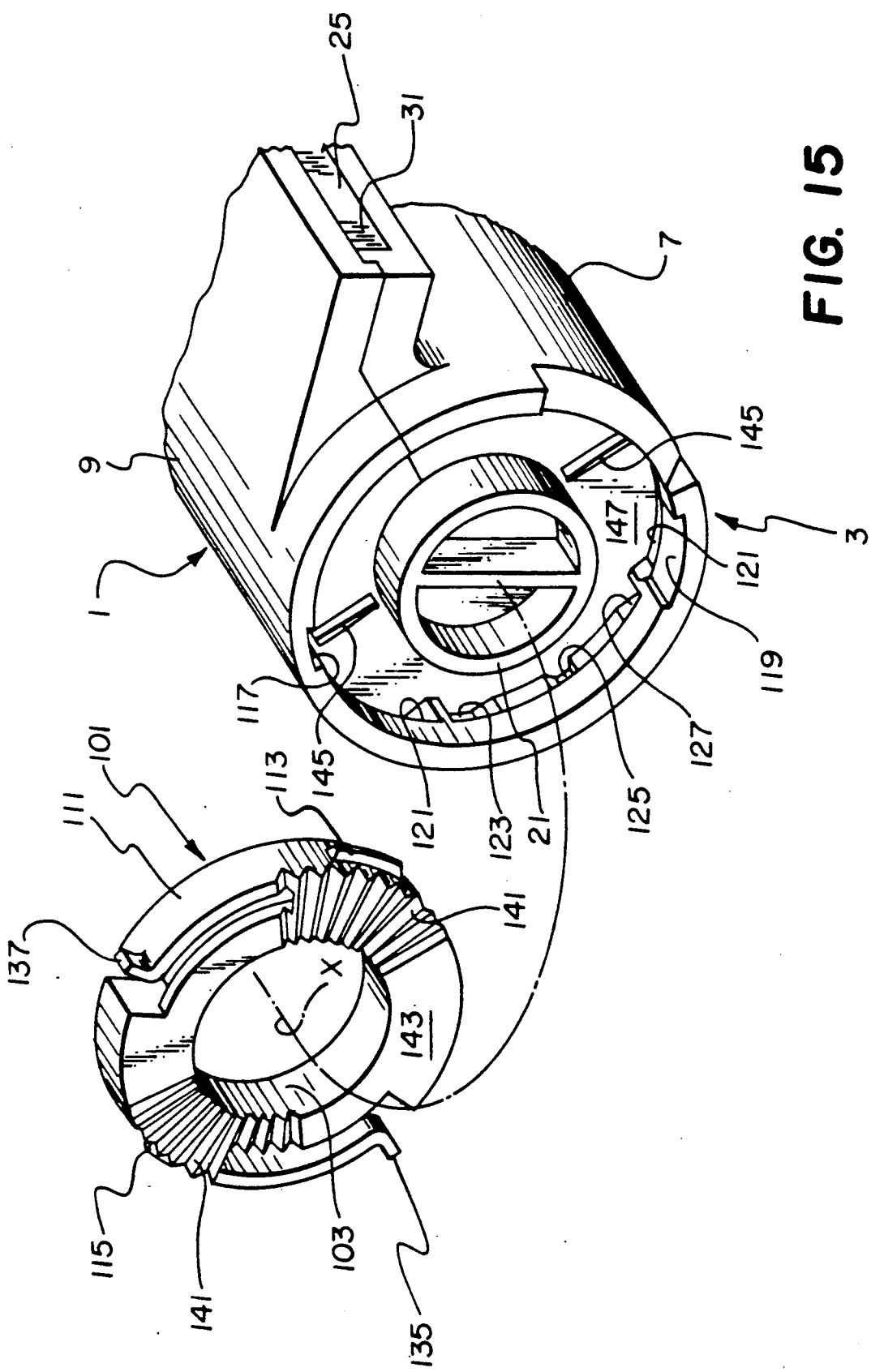
FIG. 15 is an exploded perspective similar to FIG. 14, but as seen from an under side of the film exposure status indicator.

The cassette shell 3 includes a shroud 109 which substantially surrounds a circumferential edge 111 of the status indicator 101 to prevent one from grasping the edge in order to manually rotate the indicator from its unexposed position to its partly exposed position and from the partly exposed position to its fully exposed position. To place the status indicator 101 within the confines of the shroud 109 during assembly of the film cartridge 1, a pair of axial restraining tabs 113 and 115 integrally formed with the indicator are passed through respective loading slots 117 and 119 in the shroud to an annular undercut 121 in the shroud. The undercut 121 cooperates with the tabs 113 and 115 to retain the status indicator 101 for rotation inside the shroud 109. See FIGS. 14–16.

The shroud 109 has two identical sets of three evenly spaced inside pockets 123, 125, 127 and 129, 131, 133. The pockets 123, 125, 127 and 129, 131, 133 comprising each of the sets are arranged at respective locations corresponding to the unexposed, partly exposed, and fully exposed positions of the status indicator 101. See FIGS. 14 and 15. A pair of cantilevered members 135 and 137 integrally forming respective portions of the circumferential edge 111 of the status indicator 101 are resiliently biased substantially radially of the axis X, against the shroud 109, to fall into different ones of the pockets 123, 125, 127 and 129, 131, 133 when the indicator is in its unexposed, partly exposed, and fully exposed positions, to secure the indicator releasably in those positions. The pockets 123, 129 and 125, 131 are each shaped to cooperate with the respective cantilevered members 135 and 137 to allow rotation of the status indicator 101 in the winding direction W but not in the unwinding direction U. The pockets 127, 133 are each shaped to cooperate with the respective cantilevered members 135 and 137 to prevent rotation of the status indicator 101 in the unwinding and winding directions U and W. Thus, the status indicator 101 is restricted to rotation only in the winding direction W from its unexposed position to its partly exposition and from its partly exposed position to its fully exposed position.

The shroud 109 leaves a top face 139 of the status indicator 101 substantially uncovered to allow an actuating mechanism (not shown) in a camera, for example, to engage the top face to rotate the indicator from its unexposed position to its partly exposed position and from the partly exposed position to its fully exposed position. Such an actuating mechanism is disclosed in cross-referenced application Ser. No. 07/390,931. The cassette shell 3 and the status indicator 101 include respective engagement means for locking responsive to a force applied downwardly to the top face 139 of the status indicator 101 to prevent one from rotating the indicator from its unexposed position to its partly exposed position and from the partly exposed position to its fully exposed position by pressing against the top face and attempting to rotate the indicator. Specifically, the engagement means are two series of serrations 141 running along the underside 143 of the status indicator 101 and respective ribs 145 integrally formed with one end 147 of the cassette shell 3. The serrations 141 and the ribs 145 are adapted to lock in reaction to a force applied downwardly to the top face 139 of the status indicator 101. Thus, one cannot readily tamper with the status indicator to manually rotate the indicator from its unexposed position to its partly exposed position or from the partly exposed position to its fully exposed position.

The invention has been described with reference to a preferred embodiment. However, one will appreciate that variations and modifications can be effected within the ordinary skill in the art without departing from the scope of the invention.

We claim:

1. A film cassette comprising a film spool supported inside a lighttight cassette shell for rotation about an axis to thrust a filmstrip coiled about said spool to the exterior of said shell, and a film exposure status indicator supported for rotation outside said shell about said axis from an unexposed position for providing a visible indication that said filmstrip is unexposed to an exposed position for providing a visible indication that the filmstrip is exposed, is characterized in that:

said shell includes a shroud concentrically arranged about said axis to substantially surround a circumferential edge of said status indicator in close conformity and having several pockets opposite said edge at respective locations corresponding to the unexposed and exposed positions of the status indicator; and said status indicator includes a cantilevered member forming part of said edge and resiliently urged against said shroud to fall into different ones of said pockets when the status indicator is in its unexposed and exposed positions, to releasably secure the status indicator in the unexposed and exposed positions.

2. A film cassette as recited in claim 1, wherein said cantilevered member is supported for movement substantially radially of said axis to fall into different ones of said pockets.

3. A film cassette comprising a film spool supported inside a lighttight cassette shell for rotation about an axis to thrust a filmstrip coiled about said spool to the exterior of said shell, and a film exposure status indicator supported for rotation outside said shell about said axis from an unexposed position for providing a visible indication that said filmstrip is unexposed to an exposed position for providing a visible indication that the filmstrip is exposed, is characterized in that:

said shell and said status indicator include respective engagable means at least one of which is supported for movement relative to the other substantially radially of said axis in opposite directions for engagement to secure the status indicator in its unexposed and exposed positions and for disengagement to permit rotation of the status indicator from the unexposed to the exposed position.

4. A film cassette as recited in claim 3, wherein said respective engagable means includes several pockets having locations corresponding to the unexposed and exposed positions of said status indicator and a cantilevered member resiliently urged substantially radially of said axis to fall into different ones of said pockets when the status indicator is in its unexposed and exposed positions.

* * * * *